United States Patent Office 3,008,850
Patented Nov. 14, 1961

3,008,850
PRESSURE-SENSITIVE ADHESIVE
SHEET MATERIAL
Erwin W. Ulrich, Rosemount, Minn., assignor to Minnesota Mining and Manufacturing Company, St. Paul, Minn., a corporation of Delaware
No Drawing. Filed Apr. 27, 1959, Ser. No. 808,950
The terminal portion of the term of the patent subsequent to Apr. 28, 1976, has been disclaimed
5 Claims. (Cl. 117—122)

My invention relates to normally tacky and pressure-sensitive adhesive sheet material, conveniently in the form of a narrow, flexible tape.

The present application is a continuation-in-part of my copending application Serial No. 756,059 (now U.S. Patent 2,884,126), filed August 14, 1958, as a continuation-in-part of my earlier application Serial No. 547,844, filed November 18, 1955, now abandoned. Said U.S. Patent 2,884,126 was reissued on December 13, 1960, as Re. 24,906 on a reissue application S.N. 812,077, filed May 8, 1959.

Normally tacky and pressure-sensitive adhesive tapes are widely used for a variety of sealing, fastening, mending, masking and insulating purposes. Typical pressure-sensitive adhesive formulas contain natural or synthetic rubber and a tackifier resin such as a modified rosin or one of various hydrocarbon resins, the blend providing the required four-fold balance of adhesion, cohesion, stretchiness and elasticity. However, these rubber-resin pressure-sensitive adhesives deteriorate in normal use and either soften or resinify so that the tape eventually cannot be unwound from a roll or removed from a hard, nonporous surface without undergoing delamination. When applied to paper, the adhesive may gradually penetrate the surface to leave an oil-like blot, or if the adhesive resinifies, the tape may loosen with aging.

Certain vinyl polymers such as poly-n-butyl acrylate and polyvinyl n-butyl ether, which inherently are pressure-sensitive adhesives, are much more resistant to deterioration. However, tapes coated with these homopolymers are deficient in cohesive or internal strength and are ineffective in such applications as fastening cards or pictures on vertical walls and sealing kraft paper bags in packaging items such as rice or beans. In my above-cited applications S.N. 547,844 and S.N. 756,059, I disclose that certain non-tertiary alkl acrylates, among which is poly-n-butyl acrylate, can be copolymerized with small proportions of acrylic acid or other additive copolymerizable monomer having strongly polar groups to provide much improved internal strength as compared to the polymer of the alkyl acrylate alone. This improvement is accomplished while retaining a high degree of stickiness or tackiness, so that tape coated with the adhesive copolymer adheres to most surfaces under light fingertip pressure. Filled paper bags sealed with the tape remain permanently closed, and labels adhered with the adhesive copolymer to tin cans or glass jars do not loosen in spite of prolonged storage.

These adhesive copolymers of non-tertiary alkyl acrylate and additive copolymerizable monomer vary considerably in firmness, depending for the most part upon selection of the alkyl acrylate. If the alkyl group is about 4–6 carbon atoms, the adhesive is rather harsh and firm, whereas the higher alkyl acrylates of about 7–12 carbons in the alkyl group provide softer adhesive coatings. A flexible backing coated with the softer copolymer adhesive removes smoothly from flat, non-porous surfaces but removes in a jerky or raspy manner if the adhesive is harsh.

The degree of branching in the alkyl group is another factor in firmness, and those adhesive copolymers prepared with acrylates having alkyl groups of 7 or more carbon atoms are also best characterized as harsh and resinous if the main chain of the alkyl substituent is no more than 4 carbon atoms in length or contains less than half of the total number of carbon atoms in the alkyl group. (By main chain is meant the longest straight carbon-to-carbon chain terminating at the ester group of the acrylate monomer.) On the other hand, copolymers of n-hexyl acrylate and acrylic acid or other additive copolymerizable monomer may be classed with the softer, smoother adhesives. A third factor in the firmness of these adhesive copolymers is the proportion of additive copolymerizable monomer, larger amounts providing firmer adhesives.

While harsh pressure-sensitive adhesives are preferred for many applications, softer adhesives are favored for mending, masking, mounting, packaging, sealing and the like. In such uses, the low degree of tackiness in harsh adhesives is considered by the casual user to be a mark of inferiority. While a fair degree of pressure may be required to firmly adhere tape having a harsh adhesive, one with a softer adhesive adheres strongly upon mere contact. The difference is particularly noticeable if the surface to which contact is made is somewhat dirty or moist or cold.

Particularly fine pressure-sensitive adhesive tape of the smooth type and having a high degree of tackiness is prepared with the copolymer of 90–97 parts of isooctyl acrylate and 10–3 parts of acrylic acid. Such tape is presently being widely sold in a variety of forms including electrical insulating tape, library mending tape, decorative tape, marking tape, pressure-sensitive adhesive labels, transfer tape, surgical tape, etc. However, its aggressive adhesiveness often makes it difficult to remove from a smooth nonporous surface unless the tape backing is quite strong. Removal is even more difficult if the tape remains in contact with the surface for several days or is heated in contact with the surface. Accordingly, this tape is not preferred for masking uses or for applying posters or for other temporary applications. It is for such uses, and particularly for uses calling for high packaging or holding value as well as a high degree of resistance to deterioration, that the tape of the present invention is primarily intended.

Briefly, the novel tape comprises a thin flexible backing member and a coating of a copolymer of monomers comprising (a) monomeric acrylic acid ester of non-tertiary alkyl alcohol, the alkyl group of said alcohol having from one to 14 carbon atoms, the average being 7–12 carbon atoms and including a straight chain terminating at the hydroxyl oxygen atom of at least five carbon atoms and at least one-half the total number of carbon atoms in the alkyl group, said acrylic acid ester being further characterized as being per se polymerizable to a sticky, stretchable and elastic, adhesive polymer mass; and (b) at least one monomer copolymerizable with said acrylic acid ester and selected from the group consisting of acrylonitrile and methacrylonitrile in an amount by weight with the range of about 3–12 percent of the total of said monomers (a) and (b). Said monomers and the proportions thereof are further selected to provide a normally tacky and pressure-sensitive adhesive copolymer.

In the following examples used to illustrate the invention, all parts are given by weight.

*Example 1*

A glass vessel was charged with continued stirring with 150 parts of distilled water, 2 parts of a 46% solution of alkyl aryl sodium sulfonate wetting agent ("Oronite S" paste), 94 parts of isooctyl acrylate, and 6 parts of acrylonitrile. After purging with nitrogen and bringing to 40° C., there was added 0.2 part of potassium persulfate and 0.067 part of sodium bisulfite. Within about three minutes the temperature began to rise, and the external source of heat was removed. The temperature reached a maximum of 83° C. in about 10 minutes, and stirring was continued until the contents of the vessel returned to room temperature. The reaction product was coagulated with isopropyl alcohol, and the curd was then dried by mixing with methyl alcohol. The dried curd was dissolved in a mixture of 81 parts toluene and 19 parts isopropyl alcohol to a solids concentration of 13.6%. The viscosity of the solution was 3350 centipoises, measured at 25° C. with a Brookfield viscometer. The inherent viscosity of the polymer was 2.0, determined in a solution of 85 parts heptane and 15 parts n-propyl alcohol.

The solution in toluene-isopropyl alcohol has knife-coated on a 1.7 mil-thick sheet of glossy cellulose acetate film, the reverse side of which had previously been provided with a low adhesion backsize consisting essentially of polyvinyl N-octadecyl carbamate. The coated sheet was then moved through a drying oven over a total period of about 12 minutes, initially at a temperature of 50° C., then at 60° C. and finally at 70° C. to provide a dry coating weight of 6.1 grains per 24 square inches. After drying, the sheet was slit into tapes of ½-inch width and wound upon itself into rolls, from which it was later readily unwound without delamination.

Adhesion-to-steel of the tape product was tested by rolling the tape into full contact with a polished stainless steel plate, and the measurements were taken of the force required to strip it back at an angle of essentially 180 degrees by moving the plate relative to the free end of the tape at a constant speed of 90 inches per minute. The average value in this test was 18 ounces per ½ inch of width, indicating satisfactory adhesion to steel.

The shear strength of the adhesive layer of the tape was tested under conditions of constant temperature and humidity by adhering the tape to a polished stainless steel plate by its own adhesive to provide a one-half inch square area of contact at one end of the tape. Full contact was assured by passing a 4½ pound rubber-covered roller twice in each direction over the area of contact. With the steel plate mounted vertically with the free end of the tape downward, a one kilogram weight was immediately suspended from the free end of the tape, and the time required to pull the tape away from the plate was noted. At a temperature of 24° C. and relative humidity of 50%, average time to failure was 317 minutes, indicating very high cohesive strength for a pressure-sensitive adhesive.

After the tape had been stored for 3 months, this test was repeated at 24° C., but with the relative humidity increased to 85%. Average time to failure was 201 minutes. The small decrease in cohesive strength due to increased humidity is indicative of good moisture resistance.

Another strip of the tape was rolled into full contact with a steel panel which had been painted with automotive enamel. The panel was then placed in an air-circulating oven at 121° C. for 30 minutes and then removed and allowed to cool to room temperature. The tape was then easily stripped away from the panel without leaving any adhesive residue on the panel. This test, together with the good resistance of the adhesive to organic solvents, indicates that pressure-sensitive adhesive tapes of the present invention have particular utility as masking tapes for use with oven-baked enamels. It should be noted that the aggressive adhesiveness of adhesive copolymers of the acrylate esters and acrylic acid makes undesirable their use in many masking tape uses.

Although the pressure-sensitive adhesive tape of this example is more easily removed from smooth non-porous surfaces than is tape coated with the copolymer of isooctyl acrylate and acrylic acid, it has demonstrated about equal utility in the packaging of small grain in kraft paper bags. That is, when kraft paper bags filled with 2-lb. quantities of rice were closed with a single fold and sealed with a 1.5-inch-long strip of half-inch tape applied across the fold with a quick stroking motion of the fingertips, the bags remained sealed for extended periods of time.

*Example 2*

A reaction vessel was charged with 147 parts of distilled water, 2 parts of a 46% solution of alkyl aryl sodium sulfonate wetting agent, 94 parts of isooctyl acrylate, 6 parts of acrylonitrile, and 0.02 part of tertiary dodecyl mercaptan. After purging with nitrogen and bringing to 40° C., there was added 0.2 part of potassium persulfate and 0.067 part of sodium bisulfite. The resulting polymer was recovered in heptane solution, the water being removed by boiling in the continued presence of the heptane. The polymer, in the form of a thin coating on a flexible tape backing, exhibited high packaging value.

*Example 3*

Six parts of acrylonitrile and 94 parts of isooctyl acrylate were copolymerized in aqueous emulsion following about the same procedure as in Example 2. The reaction product was converted to organic solution and then coated on cellophane film which had been previously provided with a primer coating consisting of an ultra-thin dried deposition product of an aqueous mixed dispersion of synthetic latex rubber and a mixture of polyvinyl alcohol and casein as a hydrophilic colloidal agglutinant. Although low-adhesion backsize was not used, the tape was wound upon itself in roll form and subsequently easily unwound without delamination.

The desired combination of high internal strength and softness may be achieved with adhesive copolymers including a single acrylic acid ester having 7 to 12 carbon atoms in the alkyl group. Alternatively, two or more acrylic acid esters having from 1 to 14 carbon atoms in the alkyl group may be included in the copolymer, but it is necessary that the average alkyl substituent be 7–12 carbon atoms. Methyl, ethyl, and propyl acrylates as well as longer chain acrylates including tetradecyl acrylates, and including both primary and secondary, normal and branched chain alkyl esters may be present and computed in the average. Tertiary alkyl esters do not provide the required stickiness. Small amounts of other monomers may unavoidably be associated with these monomers, or may even be deliberately added, without detracting from the value of the resulting polymer for the purposes here under consideration. The inclusion of copolymerizable ethylenically unsaturated monomers such as vinyl chloride, various methacrylate esters, butadiene, isoprene, diallyl phthalate, etc., in such limited amounts as do not drastically alter the properties of the non-tertiary alkyl acrylate ester polymer, is therefore to be considered as coming within the scope of the present invention.

The proportion of acrylonitrile and/or methacrylonitrile in the adhesive copolymer is preferably about 4–8%. However, as much as 10–12% may be preferred in conjunction with the higher acrylic acid ester monomers, which by themselves form soft sticky polymers of very low internal strength. Above about 12–15% of additive copolymerizable monomer, the polymer becomes too firm and hard for best application as a normally tacky pressure-sensitive adhesive. At less than about 3%, the improvement imparted by copolymerization with acrylonitrile or methacrylonitrile is much less significant, and such small proportion is not preferred.

For specific applications, a portion of the acrylonitrile and/or methacrylonitrile monomers may be replaced by one or more of acrylic acid, methacrylic acid, acrylamide, methacrylamide and itaconic acid.

Equivalent results in respect to high packaging value and other tape properties have not yet been attained in copolymers of alkyl acrylates and acrylonitrile and/or methacrylonitrile produced in organic solution. In making pressure-sensitive adhesive tape, the present necessity for carrying out the polymerization in aqueous emulsion generally results in the additional processing step of converting the emulsion to organic solution, since quality is difficult to control in applying the adhesive coating directly from the emulsion. Acrylic acid is more versatile and can be copolymerized with the alkyl acrylates in either aqueous or nonaqueous systems with equivalent results. However, polymerization in aqueous emulsion results in a substantial reduction in odor level and is always employed in making tapes in which odor may cause customer complaints, so that as a practical matter, the inability to carry out the polymerization in organic solvent is not too significant.

The flexible backing member of the pressure-sensitive adhesive tape of this invention may be transparent cellophane or cellulose acetate, and if the adhesive is not dyed or pigmented, the tape is transparent. Particularly useful in this respect is matte-finish cellulose acetate which provides library mending tape which becomes almost invisible when applied to a sheet of paper. Other transparent films, for example, ethyl cellulose, polyvinyl chloride, plasticized vinyl acetate-vinyl chloride copolymers, oriented polyethylene terephthalate and the like, are also effective. For instance, a pure polymer film backing such as a nylon or a polyethylene film (free from plasticizer) coated with the present pressure-sensitive adhesive provides a superior adhesive tape or sheet for surgical and medical purposes. The adhesive is relatively non-irritating to the human skin and the backing film does not include any plasticizer or other component which might otherwise migrate into the adhesive and render it irritating. This adhesive can be employed in other products useful in the surgical and medical fields, including those having cloth or nonwoven fibrous elements.

The backing member may be given a preliminary adhesive priming coat if desired, although the copolymer adhesives employed in the present invention ordinarily become firmly adherently bonded to most backings even in the absence of such priming layer. If no primer is used, the tape is usually provided with a low-adhesion backsize if it is to be wound upon itself in roll form for storage. Effective low-adhesion backsizes are described in U.S. Patent Nos. 2,532,011 and 2,607,711. Alternatively, the adhesive layer may be protected by a suitable low-adhesion liner, of which polyethylene or other high molecular weight waxy type materials are exemplary, either in film form or as a surface coating on paper or other supporting web.

Colored film may be used as the backing member, and colors or pigments or contrasting opacifiers may be incorporated in the adhesive mass where colored tape products are desired. Opaque films and films coated with single or multiple layers of various other materials may replace the transparent films. Flexible fibrous backings may also be employed, including treated or untreated paper, cloth, wadding, and the like.

What is claimed is as follows:

1. Pressure-sensitive adhesive coated sheet material comprising a flexible backing having a coating of a copolymer of monomers comprising (a) monomeric acrylic acid ester of non-tertiary alkyl alcohol, the alkyl group of said alcohol having from one to 14 carbon atoms, the average being 7–12 carbon atoms and including a straight chain terminating at the hydroxyl oxygen atom of at least five carbon atoms and of at least one-half the total number of carbon atoms in the alkyl group; and (b) at least one monomer copolymerizable with said acrylic acid ester and selected from the group consisting of acrylonitrile and methacrylonitrile in an amount by weight within the range of about 3–12 percent of the total of said monomers (a) and (b); said monomers and the proportions thereof being further selected to provide a normally tacky and pressure-sensitive adhesive copolymer.

2. Coated sheet material comprising a thin flexible backing having a coating of a copolymer of monomers comprising (a) monomeric acrylic acid ester of non-tertiary alkyl alcohol, the alkyl group of said alcohol having from one to 14 carbon atoms, the average being 7–12 carbon atoms and including a straight chain terminating at the hydroxyl oxygen atom of at least five carbon atoms and at least one-half the total number of carbon atoms in the alkyl group; and (b) acrylonitrile in an amount by weight within the range of about 3–12 percent of the total of said monomers (a) and (b); said monomers and the proportions thereof being further selected to provide a normally tacky and pressure-sensitive adhesive copolymer.

3. Normally tacky and pressure-sensitive adhesive coated sheet material comprising a thin flexible backing member having a coating of a normally tacky and pressure-sensitive adhesive copolymer of monomers consisting essentially of about 92–96 parts by weight of isooctyl acrylate and correspondingly about 8–4 parts of acrylonitrile.

4. A convolutely wound roll of the normally tacky and pressure-sensitive adhesive coated sheet material of claim 1 in narrow continuous tape form and capable of being unwound from said roll without splitting and offsetting of the adhesive copolymer coating.

5. A convolutely wound roll of the normally tacky and pressure-sensitive adhesive coated sheet material of claim 1, said sheet material being provided with a low-adhesion backsize coating on the adhesive-free major surface, said sheet material being in narrow continuous tape form and being capable of being unwound from said roll without splitting and offsetting of the adhesive copolymer coating.

References Cited in the file of this patent

UNITED STATES PATENTS

| | | |
|---|---|---|
| Re. 24,906 | Ulrich | Dec. 13, 1960 |
| 2,147,154 | Fikentscher et al. | Feb. 14, 1939 |
| 2,464,826 | Neher | Mar. 22, 1949 |
| 2,544,692 | Kugler et al. | Mar. 13, 1951 |
| 2,557,266 | Dittmar | June 19, 1951 |
| 2,570,253 | Lundquest | Oct. 9, 1951 |
| 2,601,016 | Hendricks et al. | June 17, 1952 |
| 2,607,711 | Hendricks | Aug. 19, 1952 |
| 2,884,126 | Ulrich | Apr. 28, 1959 |

FOREIGN PATENTS

| | | |
|---|---|---|
| 584,857 | Great Britain | Jan. 24, 1947 |